A. A. SANBORN & C. BURROUGHS.

Monkey-Wrench.

No. 8,005. Reissued Dec. 18, 1877.

Witnesses
J. Walter Fowler,
Chas. Gill

Inventors
A. A. Sanborn
and
Charles Burroughs
By their Attys.
Cox and Cox

N. PETERS, PHOTO-LITHOGRAPHER, WASHINGTON, D. C.

A. A. SANBORN & C. BURROUGHS.

Monkey-Wrench.

No. 8,005. Reissued Dec. 18, 1877.

Witnesses
J. Walter Fowler,
Chas. O. Gill

Inventors
A. A. Sanborn
and
Charles Burroughs
by their atty.
Cox & Cox

R. PETERS, PHOTO-LITHOGRAPHER, WASHINGTON, D. C.

UNITED STATES PATENT OFFICE.

ALBERT A. SANBORN AND CHARLES BURROUGHS, OF NEWARK, N. J.

IMPROVEMENT IN MONKEY-WRENCHES.

Specification forming part of Letters Patent No. 195,173, dated September 11, 1877; Reissue No. 8,005, dated December 18, 1877; application filed November 21, 1877.

*To all whom it may concern:*

Be it known that we, ALBERT A. SANBORN and CHARLES BURROUGHS, both of the city of Newark, in the county of Essex and State of New Jersey, have invented an Improvement in Wrenches, of which the following is a full, clear, and exact description, reference being had to the accompanying drawings.

Our invention relates to that class of wrenches in which the movable jaw is held in position by a mutilated male screw or grooved cylinder carried by such movable jaw, and engaging a mutilated female screw or rack formed in or upon the bar of the wrench, which male screw or grooved cylinder, when turned into one position, allows the movable jaw to slide freely on the wrench-bar, and when turned into another position firmly locks the said movable jaw upon, or holds the same for application to, a nut or bolt head.

The object of the invention is to produce a wrench the movable jaw of which can be set and locked at any desired distance on the wrench-bar from the fixed jaw, which is effected by means of a mutilated male screw operating in conjunction with a corresponding mutilated female screw, the ends or abutments of the threads of said screws being so beveled off as to permit the entrance of the ends of the threads of the male screw between the threads of the female screw at any point thereon at which the movable jaw may be set.

One of the objections to wrenches provided with mutilated screws as heretofore constructed is, that the screw or grooved cylinder is apt to turn by gravity or inertia, and either lock or unlock the movable jaw in certain positions, which is a serious inconvenience, and renders the use of such a wrench by one hand impracticable. Another difficulty has been that of locking the movable jaw at any desired place upon the wrench-bar. Both of these difficulties are wholly obviated by the present invention.

Figure 1:
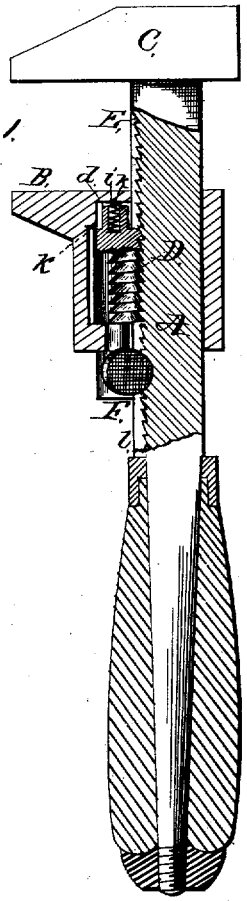
Figure 3:
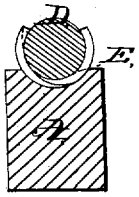
Figure 4:
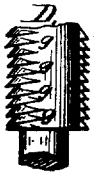
Figure 2:
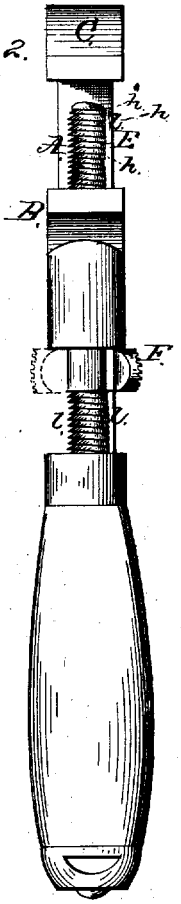
Figure 5:
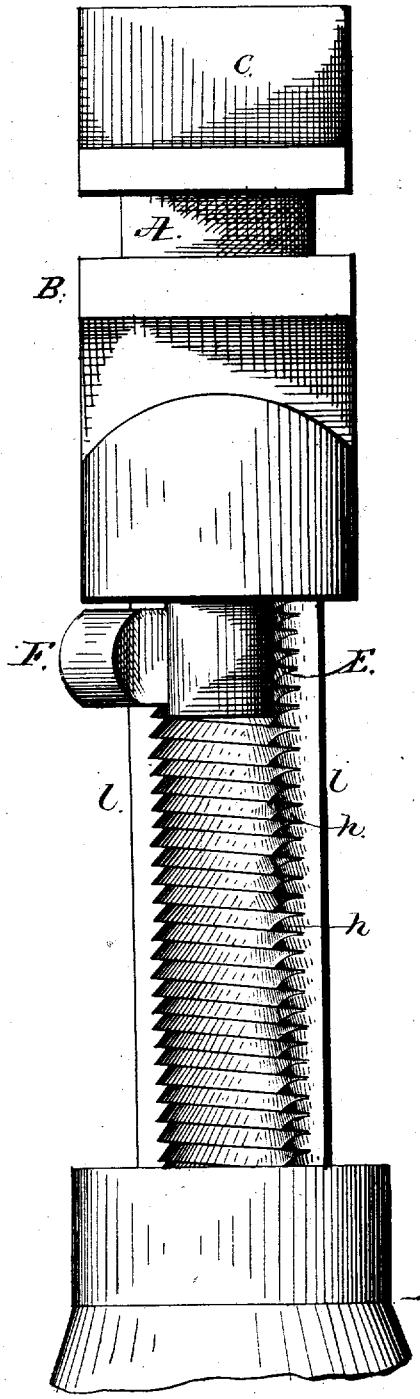

Figure 1 in the accompanying drawings represents a partial side view and a partial longitudinal section of a wrench constructed in accordance with our invention. Fig. 2 is a face view of same. Fig. 3 is a cross-section of the bar of the wrench and the mutilated male screw. Fig. 4 is a detail view of a portion of the mutilated male screw. Fig. 5 is an enlarged front view of the wrench.

A is the bar of the wrench; B, the movable jaw, and C the fixed jaw. D represents the mutilated male screw, which is placed in a recess and on suitable bearings *d* in the movable jaw, the said mutilated screw being carried by the said movable jaw, and has the ends of its threads upon the side which is advanced in turning the screw to set the jaw so beveled off as to permit the said ends to enter the spaces between the threads of the female screw E, which the male screw engages, and which has the ends of its threads beveled off for the purpose of receiving the threads of the male screw at any point.

The method of beveling or tapering the ends of the mutilated male and female screws D and E is respectively indicated by the letter *g* in Fig. 4 and by the letter *h* in Fig. 2, the latter bevel being on the lower side of the thread, where the male thread enters it. This not only secures the certain and easy entrance of the mutilated locking-screw D, but also operates to push the movable jaw toward the fixed jaw, thereby assisting in taking up any play, and causing a more accurate fit and grasp.

The mutilated male screw D has an extension projecting through the movable jaw B toward the handle of the wrench, which extension is provided with a milled or corrugated thumb-piece, F, by means of which the screw can be rotated.

When the said screw is turned one way the threads are disengaged, the smooth surface of the cylinder whereon the mutilated thread is formed coming opposite the surface of the female screw E, which permits the jaw B to move freely on the bar A; but when the thumb-piece is turned in the opposite direction, the threads of the mutilated male screw D enter the spaces between the threads of the mutilated female screw E, locking the movable jaw in place at the point where it is when the thumb-piece is rotated, as last aforesaid.

It is obvious that the same effect as to locking the movable jaw may be consummated by means of a rack on the wrench-bar, and a tongue-and-grooved cylinder substituted for the mutilated thread D, though the construction aforesaid is preferred.

To prevent the turning of the mutilated locking-screw D, a cylindrical recess, *i*, is provided in the end of the screw D, wherein is placed a friction-spring, *k*, which, bearing upon the said screw, produces such friction as to prevent its turning, except when rotated by the operator.

The wrench-bar is constructed with the smooth bearings *l*, parallel to each other, and one on each side of the mutilated female screw E. These bearings form the limit of the threads of said screw, and greatly strengthen the wrench.

What we claim as our invention, and desire to secure by Letters Patent, is—

1. The combination, with the movable jaw of a monkey-wrench, and a mutilated male screw carried by said jaw for locking the same to the bar of the wrench, of a friction-spring for holding said screw from turning, except as turned by the operator, substantially as and for the purpose specified.

2. In a wrench, a movable jaw provided with a mutilated male thread, the extremities of which are beveled off and arranged so as to engage a mutilated female screw placed in or upon the wrench-bar, and having the ends of its threads tapered or beveled, substantially as specified.

3. As a means of locking the movable jaw of a wrench at any desired point, the combination of the mutilated screws D and E, having the ends of their threads beveled off, substantially as specified.

ALBERT A. SANBORN.
CHARLES BURROUGHS.

Witnesses:
REUNE J. D. DUNN,
RUFUS H. SANBORN.